US007913300B1

(12) United States Patent
Flank et al.

(10) Patent No.: US 7,913,300 B1
(45) Date of Patent: Mar. 22, 2011

(54) CENTRALIZED ROLE-BASED ACCESS CONTROL FOR STORAGE SERVERS

(75) Inventors: Joshua H. Flank, Palo Alto, CA (US); Steven R. Klinkner, Fremont, CA (US); Benjamin B. Swartzlander, San Jose, CA (US); Timothy J. Thompson, San Jose, CA (US); Alan G. Yoder, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 1364 days.

(21) Appl. No.: 11/102,422

(22) Filed: Apr. 8, 2005

(51) Int. Cl.
*G06F 9/00* (2006.01)
(52) U.S. Cl. .................. 726/12; 726/2; 726/17; 726/21; 726/27; 726/28; 726/29; 726/30; 711/161; 709/202; 709/224
(58) Field of Classification Search .................. 726/11, 726/12, 27, 2, 17, 21, 28, 29, 30; 713/165, 713/169–181, 182–186, 201; 711/161; 709/316, 709/202, 224; 707/102
See application file for complete search history.

(56) References Cited

U.S. PATENT DOCUMENTS

| | | | | |
|---|---|---|---|---|
| 7,092,942 | B2* | 8/2006 | Frieden et al. | 707/9 |
| 7,185,359 | B2* | 2/2007 | Schmidt et al. | 726/2 |
| 7,234,032 | B2* | 6/2007 | Durham et al. | 711/161 |
| 2003/0088786 | A1* | 5/2003 | Moran et al. | 713/201 |
| 2003/0208378 | A1* | 11/2003 | Thangaraj et al. | 705/2 |
| 2003/0225889 | A1* | 12/2003 | Moutafov | 709/227 |
| 2004/0083367 | A1* | 4/2004 | Garg et al. | 713/170 |
| 2005/0172151 | A1* | 8/2005 | Kodimer et al. | 713/201 |
| 2005/0229236 | A1* | 10/2005 | Devgan et al. | 726/1 |
| 2005/0251522 | A1* | 11/2005 | Clark | 707/100 |
| 2006/0230281 | A1* | 10/2006 | Hofmann | 713/182 |

OTHER PUBLICATIONS

Decru, "Securing Networked Storage", white paper, 2003, http://www.source.be/partners/whitePapers/DECRU/Decru_DataFortWP.pdf; pp. 1-10.*
Weizhong Qiang et. al., "RB-GACA: A RBAC Based Grid Access Control Architecture", Lecture Notes in Computer Science (LNCS vol. 3032), pp. 487-494, 2004. Springer-Verlag Berlin Heidelberg.*
E. Damiani et. al., "Securing SOAP e-services", IJIS (2002), vol. 1: pp. 100-115, Springer Berlin Heidelberg.*
Joon S. Park, et al., "Role-Based Access Control on the Web", ACM Transactions on Information and System Security (ITSSEC), vol. 4, Issue 1, pp. 37-71, 2001.*

(Continued)

*Primary Examiner* — Vivek Srivastava
*Assistant Examiner* — Hee Song
(74) *Attorney, Agent, or Firm* — Perkins Coie LLP (57) ABSTRACT

Centralized role-based access control (RBAC) for storage servers can include operating multiple storage servers, each configured to provide a set of clients with access to stored data, and using a separate network server to provide centralized RBAC. The network server may include an API proxy to proxy requests to access individual APIs of a storage server by an application which is external to the network server and the storage server and may control access to the individual APIs of the storage servers on a per-API, per-user and per-object basis. The API proxy may filter responses to API calls based on the access privileges of the user of the application which sent the API call. In some embodiments, the network server may implement a Windows domain server, an LDAP server or the like to evaluate security credentials of administrative users on behalf of multiple storage servers.

13 Claims, 6 Drawing Sheets

OTHER PUBLICATIONS

Wwizhong Qiang et. al., "RB-GACA A RBAC Based Grid Access Control Architecture", Lecture Notes in Computer Science (LNCS vol. 3032), pp. 487-494, 2004. Springer-Verlag Berlin Heidelberg.*

Yi-Jung Lin, "Role-Based and Adaptive User Interface Designs in A Teledermatology Consult System: A Way to Secure and a Way to Enhance", AMIA 2003 Symposium Proceedings—p. 913.*

"Converting 4.4 modules to 4.5", pp. 1-10, downloaded from http://drupal.org/node/7176 on Mar. 21, 2005.

"AlterPath BladeManager: Console Management and A Security Gateway for IBM BladeCenter", 2004, pp. 1-6, Cyclades Corporation, downloaded from http://www.cyclades.com/resources/index.php?an=27 on Mar. 21, 2005.

Tobin Sears, "DataFabric Manager, Distributing Data with DFM", Jan. 2004, pp. 1-17, Network Appliance, Inc., Sunnyvale, California.

"Enterprise Portal 2.5 Developer's Guide, Chapter 6, Introduction", pp. 1-10, downloaded from http://manuals.sybase.com/onlinebooks/group-ep/epg0250e/devgd/@Generic_BookText... On Mar. 21, 2005.

Jeremy Blosser, "Explore the Dynamic Proxy API", Nov. 2000, pp. 1-9, JavaWorld.com, downloaded from http://www.javaworld.com/javaworld/jw-11-2000/jw-1110-proxy.html on Feb. 7, 2005.

"OpenCIRCA functions-EIONET, European Environment Information and Observation Network (EIONET), Networking improving Europe's environment, OpenCIRCA, Technical Characteristics", Nov. 11, 2002, pp. 1-5, Release 1.0, downloaded from http://www.eionet.eu.int/EIONET_Tech/CIRCA/opencircafunctions on Mar. 21, 2005.

"RMI Proxy API: Class ProxyNaming", 2003, pp. 1-7, Telekinesis Pty Ltd, Australia, downloaded from http://www.rmiproxy.com/doc/apidoc/com/rmiproxy/ProxyNaming.html on Feb. 7, 2005.

* cited by examiner

CENTRALIZED ROLE-BASED ACCESS CONTROL FOR STORAGE SERVERS

FIELD OF THE INVENTION

At least one embodiment of the present invention pertains to storage systems, and more particularly, to centralized role-based access control for storage servers.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). Filers are made by Network Appliance, Inc. of Sunnyvale, Calif.

In a SAN context, the storage server provides clients with block-level access to stored data, rather than file-level access. Some storage servers are capable of providing clients with both file-level access and block-level access, such as certain Filers made by Network Appliance, Inc.

A business enterprise or other organization that manages large volumes of data may operate multiple storage servers concurrently. These storage servers may be connected to each other through one or more networks. The storage servers and other network components may be managed by one or more network administrators (also called "administrative users" or simply "administrators"), who are responsible for configuring, provisioning and monitoring the storage servers, scheduling backups, troubleshooting problems with the storage servers, performing software upgrades, etc. These management tasks can be accomplished by the administrator using a separate management console on the network, which is a computer system that runs storage management software application specifically designed to manage a distributed storage infrastructure. An example of such storage management software is DataFabric® Manager (DFM), made by Network Appliance, Inc. of Sunnyvale, Calif.

To prevent unauthorized users from accessing and controlling functions of the storage servers, there is a need for some form of access control. There are two forms of access control: authentication and authorization. Authentication is the process of determining whether a particular user is who he claims to be, such as by verifying a username and a password. Authorization is the process of determining whether a particular user is allowed to do or access a particular function, feature, etc. Access control can be provided, at least in part, by the use of usernames and passwords, such as by assigning a username and password to each storage server, where only an authorized administrator knows the correct username and password.

Organizations which use more than one storage server often would like to have the same administrative user manage all of the storage servers with only a single username and password. Preferably, this user (and possibly administrative users) should have easy access to all of the storage servers within his network. Furthermore, connecting a new storage server to the network should be seamless, and the administrative user should be able to access it easily.

One way of accomplishing this is by assigning the same username and password to each storage server. The user names and passwords can be uploaded to the storage servers upon an initial boot, letting administrators access the appliances with only a script change. However, this solution is unwieldy for very large organizations with many administrators. With this approach, it is cumbersome to create new administrators, change passwords, and delete old administrators.

Furthermore, it may be desirable to apply different access privileges to different administrators with respect to the storage servers. For example, one network administrator may have full access privileges to control any function of any storage server, whereas another network administrator may only be authorized to control data backup operations. As a result, at least some of the different users need to have different user names and passwords. The above-mentioned approach, therefore, becomes particularly cumbersome in such situations.

Some prior art storage management software can provide centralized control of access by one or more administrators to one or more storage servers on a network. An administrator initially gains access to a management console equipped with such software by providing a username and password. Once authenticated, the administrator has access to all of the applications included in the management console and can invoke these applications with respect to any of the managed storage servers. In addition, such software can enforce different access privileges for different authorized users; for example, one authorized user may have both read and write privileges while another authorized user has only read privileges.

It may be desirable, however, to allow certain functions of a storage server to be controlled or invoked by one or more software applications that reside on computer systems separate from the storage servers or the usual management console; such applications are referred to herein as "third party" applications. For example, the storage servers and the storage management software may be made by a particular manufacturer, such as Network Appliance, Inc.; however, from a storage system user's perspective, it may be desirable for a storage management software application of another vendor to be able to access the storage servers as a third party application. As another example, a third party application might be a data backup application that resides on a computer other than the management console or the storage servers. In such a scenario, there is also a need for a convenient and centralized mechanism for controlling access by the third party application to the storage servers.

SUMMARY OF THE INVENTION

The present invention includes methods and related apparatus for centralized control of administrative access to storage servers. In one embodiment, such a method includes operating a network server which communicates with a storage server through a network, and using the network server to proxy requests to access individual APIs of the storage server by an application which is external to the network server and the storage server.

In another embodiment, the method includes receiving at a storage server a request by a user for administrative access to the storage server. The storage server is configured to provide a set of clients with access to data stored in a set of mass storage devices. The request includes a first set of security credentials. In response to detecting a predetermined indicator in the request, the first set of security credentials is forwarded to a network server for evaluation. If the network server determines that the user is an authorized user, based on the first set of credentials, the storage server receives a second set of security credentials from the network server to allow the user to access the storage server.

The invention further includes a method of executing a client application for data storage related operations. In certain embodiments, the method includes identifying a user of the client application and sending to a storage management application, via a network, a query of access privileges associated with the user. The access privileges are for controlling access to functions of a storage server managed by the storage management application. The method further includes receiving a response from the storage management application indicating access privileges associated with the user, and configuring a user interface of the client application based on the access privileges indicated in the response.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Various techniques for providing centralized role-based access control (RBAC) of storage servers are described below. In certain embodiments of the invention, multiple storage servers are operated on a network, each configured to provide a set of clients with access to data stored in a set of mass storage devices, and a centralized network server is used to provide centralized control of administrative access to the storage servers. The centralized server may be a storage management console which comprises storage management software to perform the centralized RBAC and other storage management related functions.

In certain embodiments, the storage management software stores access privileges for multiple users and includes an API proxy to provide transparent, centralized, API-level RBAC for the storage servers. In particular, the storage management software may transparently proxy requests by one or more "third party" software applications (software applications that are external to the main management console and the storage servers) to access individual APIs of the storage servers. That is, the management software may control access to APIs of the storage servers, by third party applications, on a per-API, per-user and per-object basis. The proxying may include implementing a tunneling API to proxy API calls to the storage servers in a manner which is transparent to the third party applications. The API proxy may provide in-line filtering of responses to API calls, based on user access privileges.

Hence, in certain embodiments the management software acts as both a centralized policy decision point (PDP) and a centralized policy enforcement point (PEP) for RBAC purposes. In other embodiments, the management software acts as a centralized PDP only, and the storage servers acts as their own PEPs. Other scenarios are also possible, as will be apparent from the description which follows. In addition, user interfaces of the third party applications can be tailored in appearance and behavior according to a set of dynamic RBAC rules.

Network Environment

Figure 1:
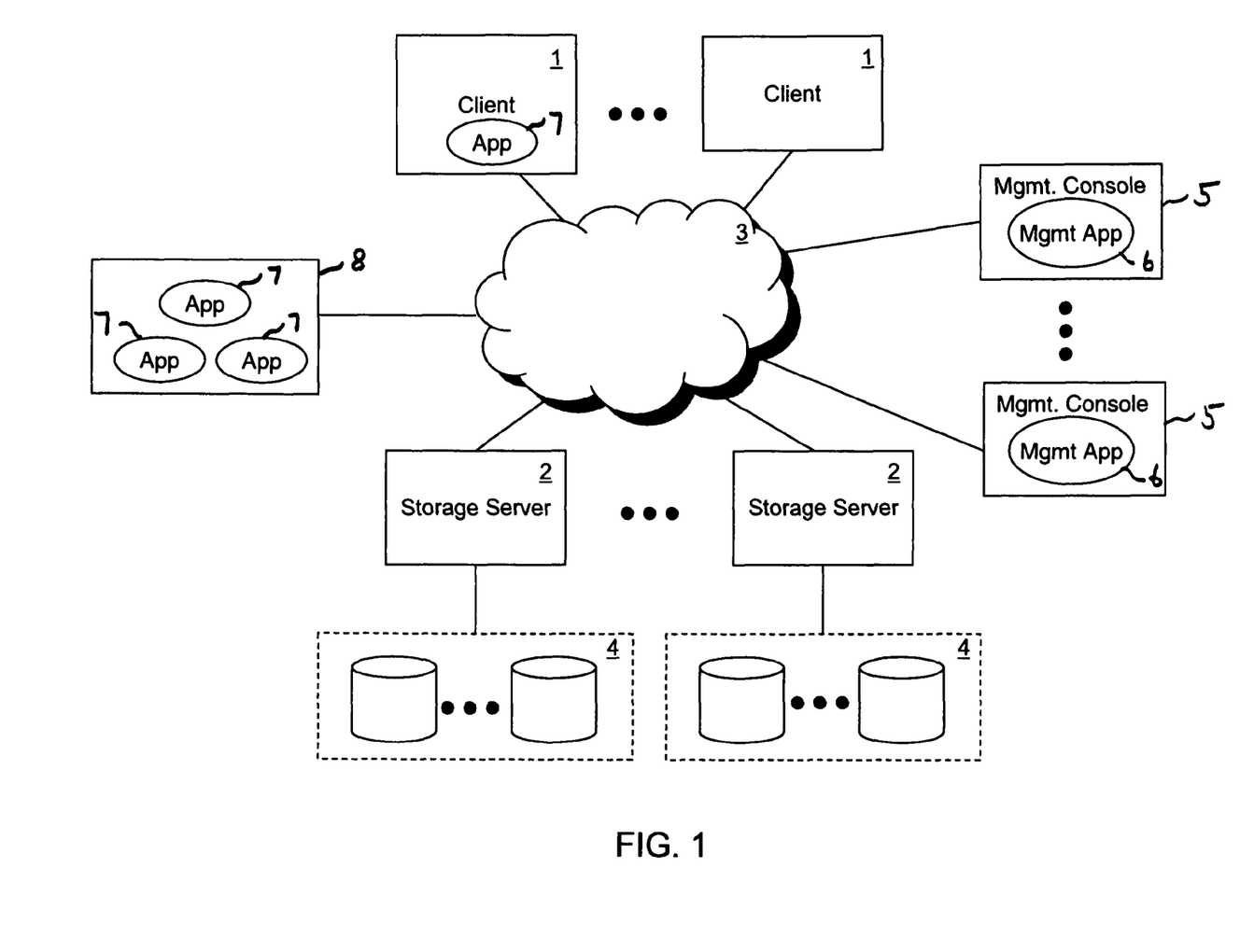
FIG. 1 illustrates a network environment in which the invention can be implemented.

FIG. 1 shows a network environment in which the invention can be implemented. In FIG. 1, a number of storage servers 2 are each coupled locally to a separate storage subsystem 4, each of which includes multiple mass storage devices. The storage servers 2 are also coupled through a network 3 to a number of clients 1. Each storage subsystem 4 is managed by its corresponding storage server 2. Each storage server 2 receives and responds to various read and write requests from the clients 1, directed to data stored in or to be stored in the corresponding storage subsystem 4.

Each of the clients 1 may be, for example, a conventional personal computer (PC), workstation, or the like. Each storage server 2 may be, for example, a file server used in a NAS mode (a "filer"), a block-based storage server such as used in a storage area network (SAN), or other type of storage server. The network 3 may be, for example, a local area network (LAN), a wide area network (WAN), or other type of network or a combination of networks. The mass storage devices in each storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in each storage subsystem 4 can be organized as a Redundant Array of Inexpensive Disks (RAID), in which case the corresponding storage server 2 accesses the storage subsystem 4 using an appropriate RAID protocol.

Also connected to the network 3 are one or more management consoles 5, each of which includes a storage management (software) application 6. One or more third party storage-related software applications 7 may also be operatively coupled to the network 3 in one or more other computer systems 8. The third party applications 7 may include, for example, one or more data backup applications, snapshot management applications, etc. Note, however, that for purposes of this description, a "third party application" generally means any software application other than the primary management application(s) and can be essentially any type of software application. In addition, a third party application can be implemented on a management console, or on storage client 1, or on any other computer system which has access to the network 3.

Centralized Access Control Using a Directory Server

Figure 2:
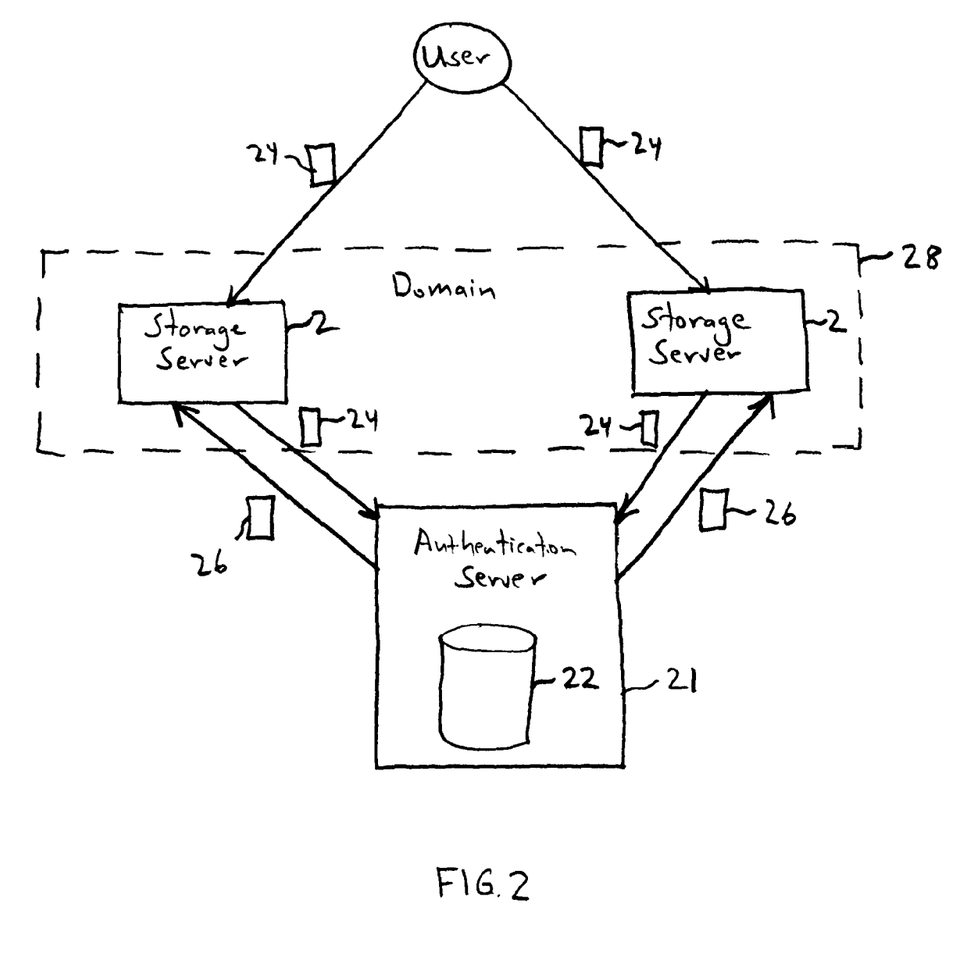
FIG. 2 shows the use of a centralized network server to provide access control to multiple storage servers.

In certain embodiments of the invention, centralized control of access to the storage servers 2 by network administrators is provided by a separate server on the network 3, to authenticate users based on their security credentials (i.e., username and password), on behalf of the storage servers 2. This functionality is illustrated in FIG. 2. The authentication server 21 contains (or has access to) a centralized database 22 which contains all of the user names and passwords associated with all of the storage servers 2. A centralized location of usernames, passwords and access controls keeps administration simple and expandable. The authentication server 21 may be implemented in one of the management consoles 5 or as a separate computer system on the network 3. With a single database, modifying user credentials can be done simply.

Examples of implementations which can be used to store usernames and password in the centralized database 22 are Network Information Service (NIS), Lightweight Directory Access Protocol (LDAP), or Microsoft Windows NT LAN Manager (NTLM)/Common Internet File System (CIFS). In a Microsoft Windows environment, users who have administrative power on the Windows domain will automatically have administrative power on a storage server 2 without any setup cost on the storage server 2. The setup can be done as part of the "cifs setup" command. This command tells the storage server 2 which server to authenticate against. All operations can be managed by the Microsoft Windows domain server (i.e., access control server), and the storage server 2 will authenticate any users against the domain server's database.

In certain embodiments of the invention, a network domain 28 is defined to include a group of storage servers 2 on behalf of which the authentication server 21 is to provide authentication. An administrator desiring to access one of the storage servers 2 can initiate the authentication process by using a conventional technique to log on to that storage server, such as Telnet, for example. The user then inputs a set of security credentials, i.e. a username and password, which are not necessarily recognizable by the storage server 2.

However, the username is defined to include a predetermined indicator of the network domain 28. For example, the username may be chosen as "Domain/admin1", where "Domain" is the name of the network domain 28 and "admin1" identifies the particular administrator. The target storage server 2 detects the presence of the domain identifier in the username, and in response, forwards the security credentials provided by the user to the authentication server 21 for evaluation.

The authentication server 21 evaluates the credentials by determining if the credentials match entries in its local access control list. If the user is thereby determined to be an authorized user, the authentication server 21 returns a second set of credentials to the storage server, which are the credentials that the storage server recognizes.

As an alternative to the foregoing approach, if the administrator initially has the second set of credentials, he could instead provide the second set of credentials directly to the target storage server 2, bypassing the authentication server 21. Of course, many variations upon the foregoing processes are possible.

In a non-Windows environment, an administrator can set up the authentication server 21 as an LDAP server, for example, to contain usernames and passwords. On first boot for a storage server 2, the administrator sets an option in the storage server 2 to point to the authentication server 21. The option indicates where the storage server 2 should look for user information and in what order. This can be set to cause the storage server 2 to contact the authentication server 21 for administrative authentication information instead of obtaining such information from its internal files, for example. From then on, any authorization request (including authenticating via username and password) 24 sent to a storage server 2 will be forwarded to the authentication server 21 for evaluation, with the result 26 returned by the authentication server 21 to the storage server 2.

In certain embodiments, if the user is attempting to perform a specific operation on the storage server 2 (e.g., accessing a particular volume), the storage server 2 also sends to server 21 an indication of the operation the user is attempting to perform and an indication of the specific object(s) (e.g., volume, file, etc.) to which the operation relates. In such an embodiment the server 21 can be an authorization server (not merely an authentication server), which acts as a PEP, deciding whether the user has access to the operation he wants to perform and/or the targeted object. Although the command is initially sent to the storage server 2, it is rerouted for authorization purposes.

Centralized Access Control Using API-Level Proxying

Referring again to FIG. 1, it may be desirable to enable one or more third party software applications 7, which may be storage management applications, to invoke or control functions of the storage servers 2, while maintaining a convenient, centralized mechanism for controlling such access. Further, it may be desirable to control such access on an API-by-API basis. In other words, a particular administrator or application may be authorized to access certain APIs of a storage server (e.g., specific commands or functions of an application) but not others.

According to certain embodiments of the invention, therefore, at least one of the storage management applications 6 can perform transparent, centralized proxying of access by the third party applications to individual APIs of the storage servers 2, while providing centralized, per-API control of such access. This is done in certain embodiments by implementing a tunneling API in the storage management application 6 which provides this functionality. This allows the storage management application 6 to operate as a centralized PDP and, in at least some embodiments, as a centralized PEP, for RBAC of the storage servers 2.

There are many types of storage-related APIs that can be proxied, and for which centralized RBAC can be provided, by using the technique introduced here. For example, the APIs may relate to functions such as monitoring, auditing, storage provisioning, backup, data recovery, data deletion, and quoting management to name just a few. As a more specific example, monitoring APIs might include an API for listing the volumes on a storage server 2, an API for getting general information about a storage server 2, an API for reporting the status of all active quotas, or an API for getting the status of a Fibre Channel service. Auditing APIs might include an API to read an arbitrary file on a storage server, bypassing file access control, or an API to list the software license codes on a storage server 2. Provisioning APIs might include, for example, an API create a new volume, an API to make a logical unit number (LUN) available to one or more hosts, or an API to export some existing file system as a CIFS share. Of course, there are many other types of APIs that can be proxied. The details of these APIs are not necessary for an understanding of the present invention.

Figure 3:
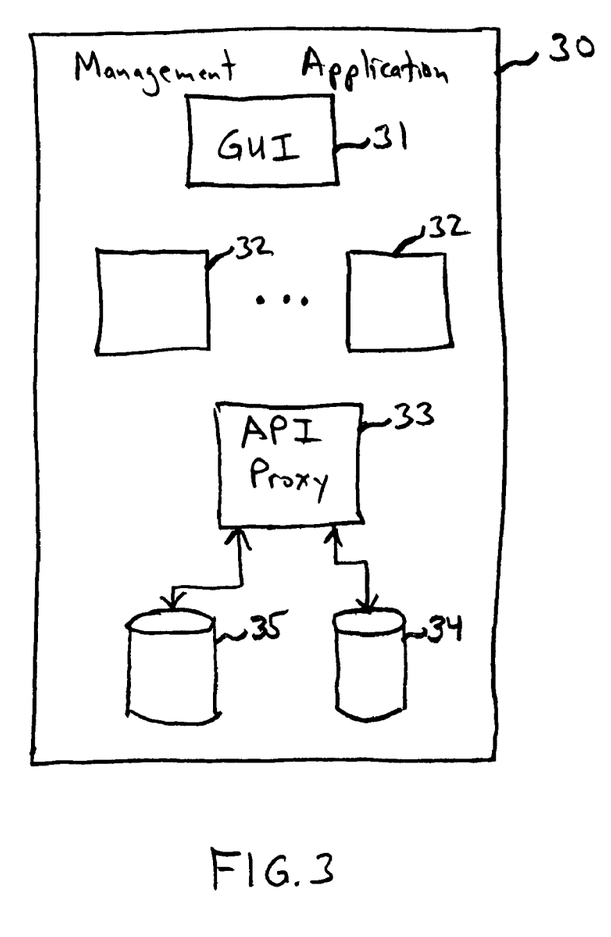
FIG. 3 shows a high-level example of a storage management application which includes an API proxy through which a third party application can access a storage server.

FIG. 3 shows a high-level example of a storage management application. The storage management application 30, which can be an example of one of the storage management applications 6 in FIG. 1, includes a graphical user interface (GUI) engine 31, various functional modules 32, an API proxy 33, an access control list (ACL) 34, and a database of storage server credentials 35. The GUI engine 31 generates a GUI to allow an administrator to access these functions. The various functional modules 32 enable various management related tasks to be performed on storage servers, such as configuring, provisioning and monitoring, scheduling backups, troubleshooting problems, performing software upgrades, etc. The particular functionality and design of these modules 32 are not germane to the present invention and therefore need not be described herein.

In general, the API proxy 33 allows a software module, such as a third party application 7 (see FIG. 1), to invoke actions in another software module running on a target device, such as a storage server 2. The actions are specified in a data structure which marshals an API name and arguments (input parameters). Input parameters are typed and can be integers, Booleans, strings, structures, and arrays of structures. The same kind of data structure is used to return the output resulting from the invocation of the action on the target device. In certain embodiments, the API proxy 33 accomplishes this in a way that allows third party applications to be written in different programming languages, without having to change the management application 30. This can be accomplished by, for example, using XML as the marshalling format for the data structure. Examples of the formats of these data structures are provided below. Transmission of the marshaled XML from one machine to another can be done in any of various ways, such as hypertext transfer protocol (HTTP) or secure HTTP (HTTPS).

Thus, the API proxy 33 is responsible for the transparent proxying of API-level access requests from third party applications 7 to the storage servers 2. In certain embodiments of the invention, the API proxy 33 accomplishes this by implementing a tunneling API. The ACL 34 contains usernames, passwords and privileges information, which are used by the API proxy 33 to determine whether to grant or deny the request by the third party applications 7.

Figure 4:
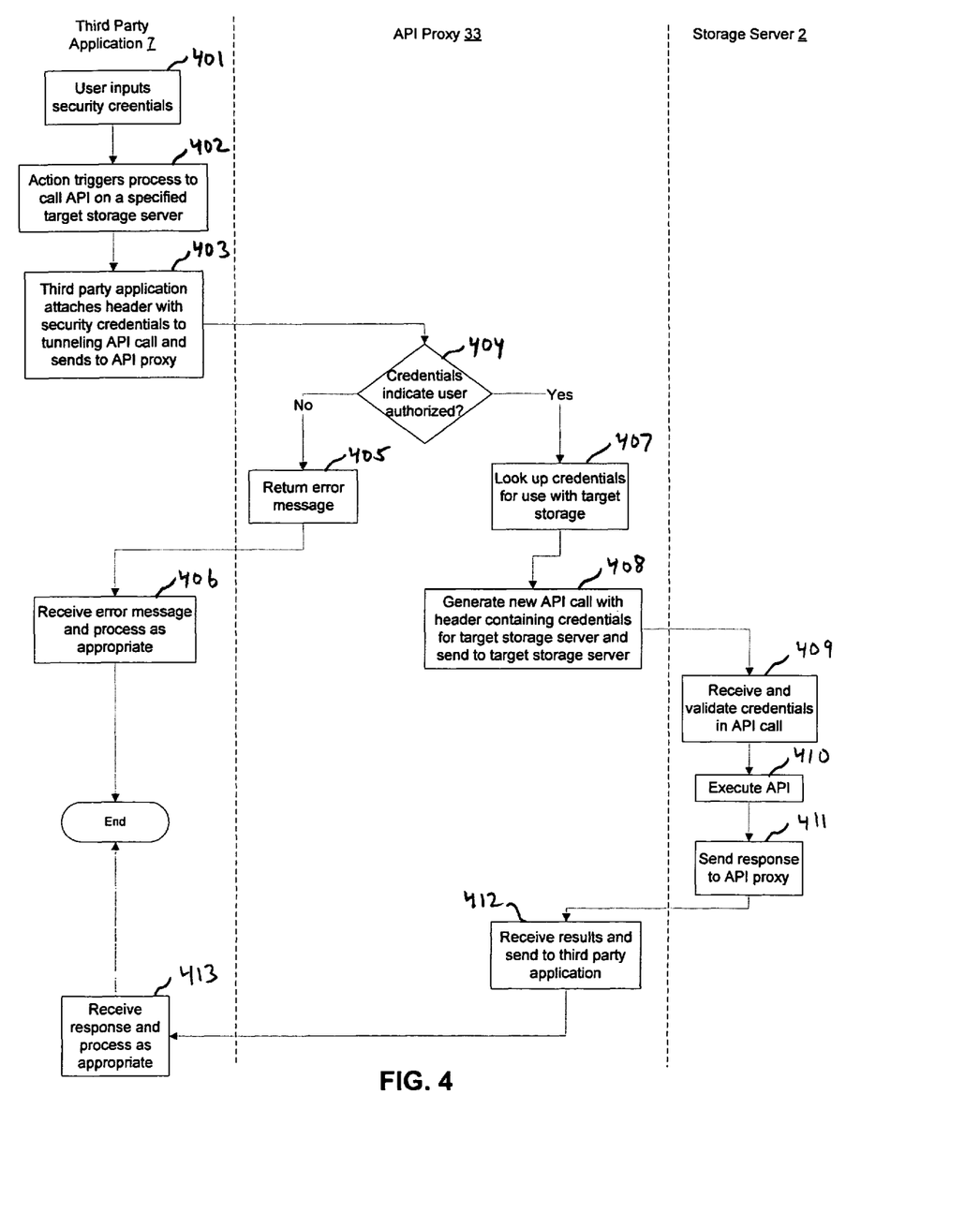
FIG. 4 is a flow diagram showing a process of API proxying to access a storage server.
Figure 5:
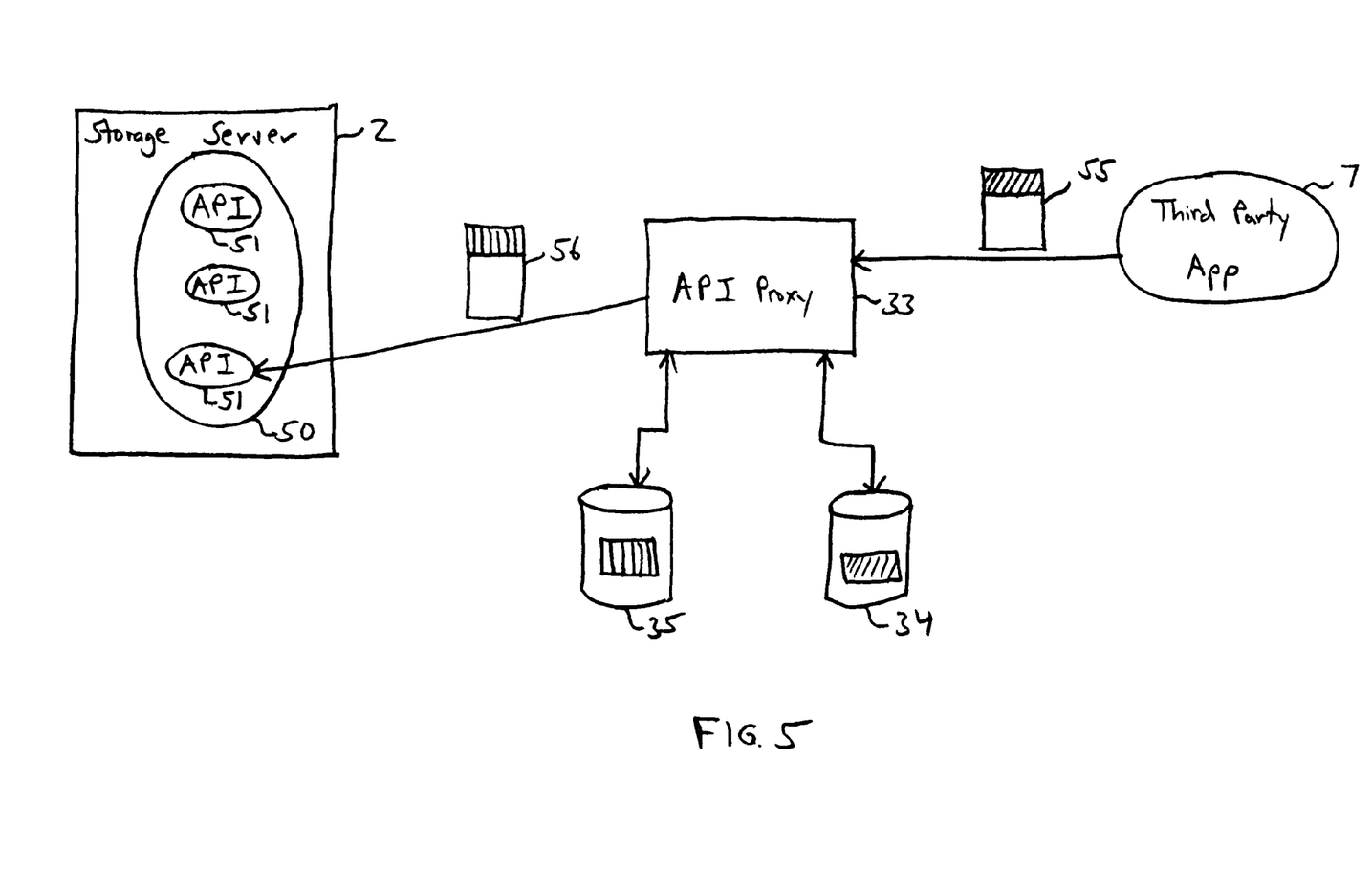
FIG. 5 schematically shows the elements involved in the process of FIG. 4.

This technique is described further now with reference to FIGS. 4 and 5. FIG. 4 shows an example of the overall process which may be performed by API proxy 33. As shown in FIG. 5, the API proxy 33 is an intermediary between a third party application 7 and a storage server 2. The storage server 2 includes one or more applications 50, each of which implements a number of APIs 51 to provide various different functions.

Initially, at block 401 in FIG. 4, a user of the third party application 7 gains access to the management software application 30 (which operates in a management console 5) by providing a correct username and password over a network connection. Thereafter, a user input directed to the third party application 7 or an automated action (e.g., at a predetermined event or time) triggers a process to call a particular API of the storage server 2 ("the target storage server") from the third party application 7 at block 402. The particular API to be called may be specified by (or according to) the user input or by predetermined programming. The third party application 7 then responds to this action at block 403 by embedding the specified API call within a tunneling API call, which is described further below, attaching a Hypertext Transfer Protocol (HTTP) header containing the security credentials of the user (i.e., username and password) to the tunneling API call, and then sending the tunneling API call 55 with header to the API proxy 33. An example of the format of the tunneling API call is provided below. The security credentials provided by the user are to gain access to the management application 30 only and are not recognized by the target storage server or any other storage server.

At the management console 5, the API proxy 33 receives the tunneling API call 55 transmitted from the third party application 7 and, at block 404, checks the security credentials in the header against the ACL 34. In certain embodiments of the invention, the API proxy 33 only determines whether the user is authorized to access the management software application 30, and any authorized user is granted full access privileges. In other embodiments, users can have either full access privileges or privileges to access to only specified APIs and/or objects (e.g., volumes, files, etc.), as specified in the ACL 34.

Further, the API proxy 33 may perform in-line filtering of a storage server's responses, based on the user's capabilities. For example, a third party application 7 may submit an API call to the management application 30 to view all volumes that meet specified criteria. If the result returned by the API is, for example, volumes A, B, and C, but the user of the third party application 7 does not have access to volume B, then the API proxy 33 will only return objects A and C to the third party application 7, not volume B.

Referring again to FIG. 4, block 404, if the user is determined not to be authorized (i.e., authorized to access the management software application, the specific API and/or the specific object(s) specified in the call), the API proxy 33 causes an error message to be returned to the third party application 7 at block 405, where an appropriate message is output to the user at block 406. If, on the other hand, the user is determined to be authorized, the API proxy 33 then looks up, in the storage server credentials database 35 at block 407, the appropriate credentials (username and password) for accessing the target storage server 2. At block 408 the proxy API 33 then generates a new API call 56 with an HTTP header containing the credentials for accessing the target storage server 2 and then forwards the new API call 56 with the new header to the target storage server 2. An example of the format of the new API call is provided below.

At block 409 the target storage server 2 receives this API call from the API proxy 33 and validates the credentials (the credentials should always be valid in this step, since they were sent from the management application 5). The target storage server 2 then executes the specified API at block 410, and returns the results of executing the API to the API proxy 33 at block 411. The API proxy 33 then receives the results from the storage server 2 and forwards them to the third party application 7 at block 412. At block 413, the third party application receives the results of executing the API and processes them as appropriate. Examples of the formats of these responses are discussed below.

In certain embodiments, a non-transparent API proxy 33 is implemented in accordance with the following interface description:

```
/*********************************************************************
*
* @api        api-proxy
* @desc       Proxy an API request to a third party and return the
*             API response.
* @errno      EINVALIDINPUTERROR
* @errno      EINTERNALERROR
* @errno      EACCESSDENIED
*
* @input      target
```

```
 * @type              string
 * @desc              The target host. May be a hostname (qualified or unqualified) or
 *                       a vfiler name.
 *
 * @input             request
 * @type              api-request-info
 * @desc              The request to be forwarded to another server.
 *
 * @input             username
 * @type              string, optional
 * @desc              User account to use for executing the API. If none is
 *                       specified, the highest privilege available will be
 *                       attempted. The proxy server may have a security policy
 *                       that restricts the accepted values for this field. Invalid
 *                       values will cause EACCESSDENIED.
 *
 * @input             timeout
 * @type              integer, optional
 * @desc              Number of seconds that the proxy server should wait for a
 *                       response before giving up.
 *
 * @output            response
 * @type              api-response-info
 * @desc              The response from the other server.
 *
 *
 * @typedef           api-request-info
 * @desc              One API request.
 *
 *    @element        name
 *    @type           string
 *    @desc           API name. The proxy server may have a security policy
 *                       that restricts the accepted values for this field. Invalid
 *                       values will cause EACCESSDENIED.
 *
 *    @element        args
 *    @type           api-args-info, optional
 *    @desc           The API arguments.
 *
 * @typedef           api-args-info
 * @desc              Arguments to an API request (contents variable).
 *
 * @typedef           api-response-info
 * @desc              One API response.
 *
 *    @element        status
 *    @type           string
 *    @desc           Status of the response. May be "passed" or "failed".
 *
 *    @element        errno
 *    @type           integer, optional
 *    @desc           Error code. Only present if status is "failed".
 *
 *    @element        reason
 *    @type           string, optional
 *    @desc           Reason string. Only present if status is "failed".
 *
 *    @element        results
 *    @type           api-results-info, optional
 *    @desc           The API results. Only present if status is "passed".
 *
 * @typedef           api-results-info
 * @desc              Results of a successful API (contents variable).
 *
 ***********************************************************************/
```

In certain embodiments of the invention, the security policy is to always ignore the contents of the username field. All values will be accepted for the name field of api-request-info. Other embodiments may have static or dynamic policies that restrict what APIs a user can invoke and what user identities the API proxy 33 will allow the user to invoke them as.

The API proxy 33 protocol will now be further described, according to certain embodiments of the invention. Assume there are three machines involves in a transaction:

THIRDPARTY is running a third party management application 7.

MANAGER is a management console 5.

STORAGE is a storage server 2.

The following is an example of how the raw data might look in a request (API call) if no API proxy was involved:

| THIRD- | <?xml version='1.0' encoding='utf-8' ?> |
| PARTY → | <!DOCTYPE netapp SYSTEM 'file:/etc/netapp_filer.dtd'> |
| STORAGE | <netapp xmlns="http://www.netapp.com/filer/admin" |

```
STOR-         version="1.0">
              <volume-options-list-info>
                <volume>vol0</volume>
              </volume-options-list-info>
              </netapp>
STOR-         <?xml version='1.0' encoding='UTF-8' ?>
AGE →         <!DOCTYPE netapp SYSTEM '/na_admin/netapp_filer.dtd'>
THIRD-        <netapp version='1.1'
PARTY         xmlns='http://www.netapp.com/filer/admin'>

<options>
                    <volume-option-info>
                      <name>raidsize</name>
                      <value>8</value>
                    </volume-option-info>
                    <volume-option-info>
                      <name>maxdirsize</name>
                      <value>10485</value>
                    </volume-option-info>
                    <volume-option-info>
                      <name>raidtype</name>
                      <value>raid4</value>
                    </volume-option-info>
                  </options>

</netapp>
```

In contrast, the following is an example of the raw data in a request when the API proxy 33 s involved:

```
THIRD-        <?xml version='1.0' encoding='utf-8' ?>
PARTY →       <!DOCTYPE netapp SYSTEM 'file:/etc/netapp_filer.dtd'>
MANA-         <netapp xmlns="http://www.netapp.com/filer/admin"
GER           version="1.0">
                <api-proxy>
                  <target>STORAGE</target>
                  <request>
                    <name>volume-options-list-info</name>
                    <args>
                      <volume>vol0</volume>
                    </args>
                  </request>
                </api-proxy>
              </netapp>
MANA-         <?xml version='1.0' encoding='utf-8' ?>
GER →         <!DOCTYPE netapp SYSTEM 'file:/etc/netapp_filer.dtd'>
STORAGE       <netapp xmlns="http://www.netapp.com/filer/admin"
              version="1.0">
                <volume-options-list-info>
                  <volume>vol0</volume>
                </volume-options-list-info>
              </netapp>
STOR-         <?xml version='1.0' encoding='UTF-8' ?>
AGE →         <!DOCTYPE netapp SYSTEM '/na_admin/netapp_filer.dtd'>
MANA-         <netapp version='1.1'
GER           xmlns='http://www.netapp.com/filer/admin'>

<options>
                    <volume-option-info>
                      <name>raidsize</name>
                      <value>8</value>
                    </volume-option-info>
                    <volume-option-info>
                      <name>maxdirsize</name>
                      <value>10485</value>
                    </volume-option-info>
                    <volume-option-info>
                      <name>raidtype</name>
                      <value>raid4</value>
                    </volume-option-info>
                  </options>

</netapp>
MANA-         <?xml version='1.0' encoding='UTF-8' ?>
GER →         <!DOCTYPE netapp SYSTEM
THIRD-        'http://10.34.25.41:8088/netapp_server.dtd'>
PARTY         <netapp version='1.1'
              xmlns='http://www.netapp.com/filer/admin'>

<response>
                    <status>passed</status>

<options>
                        <volume-option-info>
                          <name>raidsize</name>
                          <value>8</value>
                        </volume-option-info>
                        <volume-option-info>
                          <name>maxdirsize</name>
                          <value>10485</value>
                        </volume-option-info>
                        <volume-option-info>
                          <name>raidtype</name>
                          <value>raid4</value>
                        </volume-option-info>
                      </options>

</response>

</netapp>
```

In the API proxying technique described above, the API proxy 33 can direct a request to a specific storage server 2 as determined by, for example, the API request itself or some configuration information used by the API proxy 33. In other embodiments, however, the API proxy 33 can dynamically determine to which of multiple storage servers 2 to send an API request. This dynamic determination can be made based on any one or more of various criteria, such as data in the request, the source of the request, the current configuration of the storage servers 2, the current load on the storage servers 2, other environmental conditions, etc.

In the embodiments described above, the API call from the third party application is embedded within a tunneling API call. In certain embodiments, this embedding can be made invisible to third party application, by performing this function inside a software development kit (SDK) library. In this way, the third party application can be freed from any knowledge of whether the API is being proxied or not.

RBAC Based Tailoring of Client User Interface

In accordance with certain embodiments of the invention, the user interface of a third party application 7 can be tailored in appearance and/or behavior according to RBAC rules maintained by the centralized management application 30. This functionality addresses one problem with existing solutions, i.e., that they generally expose users of an application to the full functionality of the application, sometimes allowing tasks and operations to fail when permissions to complete them do not exist.

One possible way of tailoring is to add or remove features (e.g., tasks and capabilities) to or from the application's user interface based on a user's capabilities. For example, a user may or may not have access to the "delete" operation for a particular object (e.g., a volume) stored on the storage server 2. In that case, the delete option may be hidden from view when that object is selected. As another example, the third party application may choose to display or hide an icon representing a feature based on the user's capabilities. As yet another example, the application may maintain a list (add, modify, delete) of tasks for object and choose to display as "inactive" any items for which the user does not have permissions.

Another type of tailoring is for the third party application to automatically launch entirely different sets of code, based on a determination of the user's capabilities. For example, the client application may determine whether the current user is a backup administrator and, if so, automatically launch a backup application, and if not, automatically launch a different application.

To implement these types of tailoring, the third party application 7, as the client, can formulate and execute API calls as, for example, XML queries over HTTP or HTTPS, to the management application 30. These include API calls for specifying user capabilities, for managing user capabilities, and for querying user capabilities. The third party application 7, maintains a concept of "the current user" and can transmit capability queries to the management application 30 regarding that user automatically in a manner which is transparent to the user. Based on responses to these queries, the third party application 7 maintains a list of features and tasks, which are parameterized according to the user's capabilities.

On the server side, the management application 30 includes a corresponding suite of APIs for administering user capabilities. More particularly, the management server 30 includes one or more APIs for specifying user capabilities, one or more APIs for managing user capabilities, and one or more APIs for responding to queries of user capabilities from third party applications. For example, one API may allow a third party application 7 to specify to the management application 30, "User XYZ has the 'delete' capability for object DEF". Another API might allow the management application 30 to respond to a query from a third party application 7 such as, "Does user XYZ have the 'delete' capability for object DEF?". Still other APIs may be used for query purposes that perform filtering operations. For example, as described above, when asked to return a list of objects, a particular object may be filtered out by the management application 30 (e.g., by the API proxy 33) if the user does not have read capabilities for that object (i.e., in-line filtering).

Thus, as described above, in certain embodiments the management application 30 acts as both a centralized PDP and a centralized PEP for RBAC purposes, where the storage servers 2 trust the management application 30. In other embodiments, the management application 30 acts as a centralized PDP only, and the storage servers acts as their own PEPs, which trust the management application 30's PDP. In other embodiments, a storage server 2 could act as a limited PDP and PEP, such as where the RBAC is on a per-API and per-user basis. Alternatively, a directory server could act as a PDP and limited PEP (e.g., enforcing only authentication), where the storage servers 2 act as a PEP, as described above.

Figure 6:
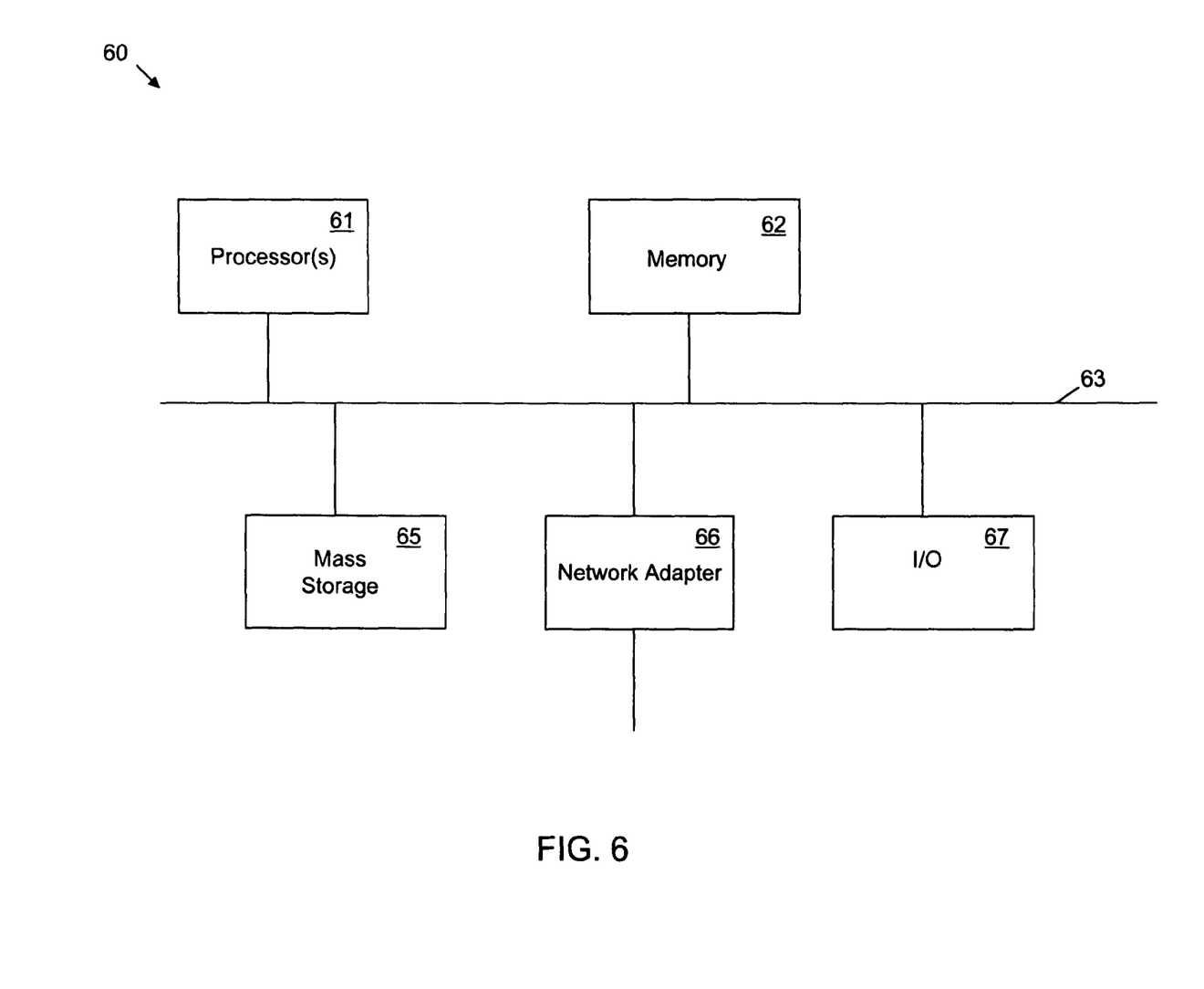
FIG. 6 is a high-level block diagram of a processing system.

As indicated above, the techniques introduced herein can be implemented in software, either in whole or in part. FIG. 6 is a high-level block diagram showing an example of the architecture of a processing system, at a high level, in which such software can be embodied. In certain embodiments, the processing system 60 is a management console 5. In other embodiments, the processing system 60 is a storage server 2. In still other embodiments, the processing system 60 is a separate network server or other form of processing system. Note that certain standard and well-known components which are not germane to the present invention are not shown.

The processing system 60 includes one or more processors 61 and memory 62, coupled to a bus system 63. The bus system 63 shown in FIG. 6 is an abstraction that represents any one or more separate physical buses and/or point-to-point connections, connected by appropriate bridges, adapters and/or controllers. The bus system 63, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 61 are the central processing units (CPUs) of the processing system 60 and, thus, control its overall operation. In certain embodiments, the processors 61 accomplish this by executing software stored in memory 62. A processor 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 represents any form of random access memory (RAM), read-only memory (ROM), flash memory, or the like, or a combination of such devices. Memory 62 includes the main memory of the processing system 60. Memory 62 may store software which implements the techniques introduced above.

Also connected to the processors 61 through the bus system 63 are one or more internal mass storage devices 65, and a network adapter 66. Internal mass storage devices 65 may be or include any conventional medium for storing large volumes of data in a non-volatile manner, such as one or more magnetic or optical based disks. The network adapter 66 provides the processing system 60 with the ability to communicate with remote devices (e.g., clients 1) over a network and may be, for example, an Ethernet adapter, a Fibre Channel adapter, or the like. The processing system 60 may also include one or more input/output (I/O) devices 67 coupled to the bus system 63. The I/O devices 67 may include, for example, a display device, a keyboard, a mouse, etc. If the processing system 60 is a storage server 2, it may include a storage adapter (not shown), such as a Fibre Channel adapter or a SCSI adapter, to allow the storage server 2 to access a set of mass storage devices.

Thus, a method and apparatus for centralized control of administrative access to storage servers have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    operating a network server which communicates with a storage server through a network, wherein the network server includes a management application for controlling management tasks associated with the storage server;
    using the network server to proxy requests to access a plurality of APIs of the storage server, the requests being from a client application which is external to the storage server and the network server, wherein using the network server to proxy a request to access a given API of the plurality of APIs includes:
- in the network server, storing a set of access privileges for a plurality of users, including a user of the client application;
- receiving from the client application a first API call for accessing the given API of the storage server, the first API call having associated therewith a first set of security credentials not associated with the storage server;
- based on the first set of security credentials, determining whether the user of the client application is authorized to access the management application of the network server;
- if the user is an authorized user of the management application, then using the network server to look up a second set of security credentials associated with the storage server, and sending a second API call, for accessing the given API to the storage server with the second set of security credentials;
- receiving a result of executing the given API from the storage server;
- looking up a set of access privileges associated with the user of the client application;
- filtering the result of executing the given API based on the set of access privileges associated with the user of the client application; and
- providing the filtered result to the client application as a response to the first API call; and
- using the network server to provide access to a selected subset of the plurality of APIs of the storage server based on a role associated with the client application.

2. A method as recited in claim 1, wherein using the network server to provide access to a selected subset of the plurality of APIs of the storage server based on a role associated with the client application comprises:
providing access control on a per-user basis for a plurality of users.

3. A method as recited in claim 2, wherein using the network server to provide access to a selected subset of the plurality of APIs of the storage server based on a role associated with the client application comprises:
using the network server to control access to individual objects maintained by the storage server.

4. A method as recited in claim 3, wherein using the network server to proxy requests to access a plurality of APIs of the storage server comprises implementing a tunneling API in the proxy to proxy API calls to the storage server transparently to the client application.

5. A method as recited in claim 1, further comprising:
receiving a query of capabilities of a user from the client application; and sending to the client application a response indicating capabilities of the user.

6. A method as recited in claim 1, wherein the result comprises a set of objects, and wherein at least one object, of the set of objects is not included in the filtered result.

7. A method as recited in claim 1, further comprising, in the network server:
- receiving an API call from the client application;
- in response to the API call, dynamically selecting the storage server to receive the API call, from among a plurality of storage servers; and
- proxying the API call to the storage server.

8. A processing system comprising:
a processor;
a network interface through which to communicate with a plurality of storage servers over a network; and
a storage facility storing:
a storage management application, for execution by the processor, to enable remote management of the storage servers by a user, and an API proxy, for execution by the processor, to proxy requests to access a plurality of APIs of the storage servers on a per-API basis, the requests originating from a client application which is external to the processing system and the storage servers, including providing access control to a selected subset of the plurality of APIs of the storage server based on a role associated with the client application, wherein the API proxy further is to:
- in the API proxy, store a set of access privileges for a plurality of users, including a user of the client application;
- receive from the client application an API call for accessing an API of a given storage server of the plurality of storage servers, the API having associated therewith a first set of security credentials not associated with the given storage server;
- based on the first set of security credentials, determining whether the user of the client application is authorized to access the storage management application of the storage facility;
- if the user is an authorized user of the storage management application, then looking up a second set of security credentials associated with the given storage server, and sending a second API call, for accessing the API, to the given storage server with the second set of security credentials;
- receiving a result of executing the API from the storage server;
- looking up a set of access privileges associated with the user of the client application;
- filtering the result of executing the API based on the set of access privileges associated with the user of the client application; and
- providing the filtered result to the client application as a response to the first API call.

9. A processing system as recited in claim 8, wherein the proxy implements a tunneling API to proxy the requests to access the individual APIs to the storage servers, transparently to the client application.

10. A processing system as recited in claim 8, wherein the processing system provides centralized control of access to individual APIs of the storage servers by a plurality of applications which are external to the processing system and the storage servers.

11. A processing system as recited in claim 8, wherein the processing system maintains, and is operable to evaluate, a set of security credentials for use in accessing at least-one of the storage servers.

12. A processing system as recited in claim 8, wherein the processing system comprises both an access policy decision point (PDP) and an access policy enforcement point (PEP) for purposes, of controlling access: to the storage servers.

13. A processing system as recited in claim 8, wherein the result comprises a set of objects, and wherein at least one object of the set of the objects is omitted from the filtered result.

* * * * *